US008953117B2

(12) United States Patent
Rosenau et al.

(10) Patent No.: US 8,953,117 B2
(45) **Date of Patent: *Feb. 10, 2015**

(54) VENTED WATERPROOF TOUCH SCREEN PANEL

(71) Applicant: Balboa Instruments, Inc., Tustin, CA (US)

(72) Inventors: Paul Rosenau, Santa Ana, CA (US); Tony Pipitone, Dove Canyon, CA (US); Jerrell P. Hollaway, MelBourne, FL (US)

(73) Assignee: Balboa Water Group, Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,604

(22) Filed: Oct. 5, 2012

(65) Prior Publication Data

US 2013/0027861 A1 Jan. 31, 2013

Related U.S. Application Data

(63) Continuation-in-part of application No. 12/661,530, filed on Mar. 19, 2010, now Pat. No. 8,294,843.

(51) Int. Cl.
*G02F 1/1333* (2006.01)

(52) U.S. Cl.
CPC ...... *G02F 1/13338* (2013.01); *G02F 1/133308* (2013.01); *G02F 2001/133311* (2013.01); *G02F 2201/36* (2013.01)
USPC ........................................... 349/58; 349/122

(58) Field of Classification Search
USPC .......................................................... 349/58
See application file for complete search history.

(56) References Cited

U.S. PATENT DOCUMENTS 6,355,881 B1 * 3/2002 Braeges et al. ............... 174/521
2002/0149571 A1 * 10/2002 Roberts ......................... 345/174
2005/0144863 A1 * 7/2005 Collins ........................ 52/204.5
2008/0246741 A1 * 10/2008 Hinata .......................... 345/173
2009/0244026 A1 * 10/2009 Purdy et al. ................... 345/174
2010/0238119 A1 * 9/2010 Dubrovsky et al. ........... 345/169
2012/0300486 A1 * 11/2012 Matsushita et al. ........... 362/521

* cited by examiner

*Primary Examiner* — Uyen Chau N Le
*Assistant Examiner* — Chris Chu
(74) *Attorney, Agent, or Firm* — Larry K. Roberts

(57) ABSTRACT

A waterproof user interface panel includes an electronic display assembly having a touch sensitive surface for activation of touch switches, and a housing including a cutout area. A protective film is disposed over the assembly and secured to the housing. The housing includes a top surface, a bottom surface and a peripheral sidewall to define a housing cavity. Sealing material covers the bottom surface, with a void between the top surface of the sealing material and the electronic display assembly. A vent is provided between the void and the external environment to allow air to pass. A filter may be positioned in the vent to prevent the passage of water droplets through the filter while allowing the passage of air and water vapor.

10 Claims, 6 Drawing Sheets

1 5 13 4 9 7 8 6 15 2 11 3 12 10

VENTED WATERPROOF TOUCH SCREEN PANEL

CROSS-REFERENCE TO RELATED APPLICATION

This application is a continuation-in-part of U.S. application Ser. No. 12/661,530 filed Mar. 19, 2010, the entire contents of which are hereby incorporated by reference.

BACKGROUND

1. Field of the Invention

This invention relates to touch screen user interface panels and, more particularity, to touch screen panels used in wet environments, such as in spas and hot tubs.

2. Discussion of Related Art

There have been many touch screen products developed for use in wet environments. Most of these products, however, rely on the waterproof construction of the LCD/touch screen assembly for moisture protection. All of these products are expensive to build because of the specialized construction required for the LCD/touch screen assembly.

Prior to the present invention, few successful efforts have been made to protect an ordinary LCD and touch screen switch from moisture intrusion by the construction of the product's housing.

SUMMARY

Embodiments of the present invention teaches the use of a protective film over a touch screen to protect against moisture intrusion from the top of the product. The film is carefully chosen to lie flat on the surface of the touch screen and be of a thickness that will allow activation of the touch screen switches with normal pressure.

In practice, a touch screen switch is positioned and secured over a LCD display, forming an assembly. The LCD/touch screen assembly is then positioned in a special housing that allows the use of conventional sealing materials to protect against moisture intrusion from all directions.

In another embodiment, a vent is established between a void within the sealed housing and the ambient atmosphere. The vent is covered by a filter which blocks transfer of solid water, but allows air and water vapor to pass.

BRIEF DESCRIPTION OF THE DRAWINGS

FIG. 1 illustrates the construction of an exemplary embodiment of a touch screen panel in a cross sectional view.

DETAILED DESCRIPTION

Figure 1:
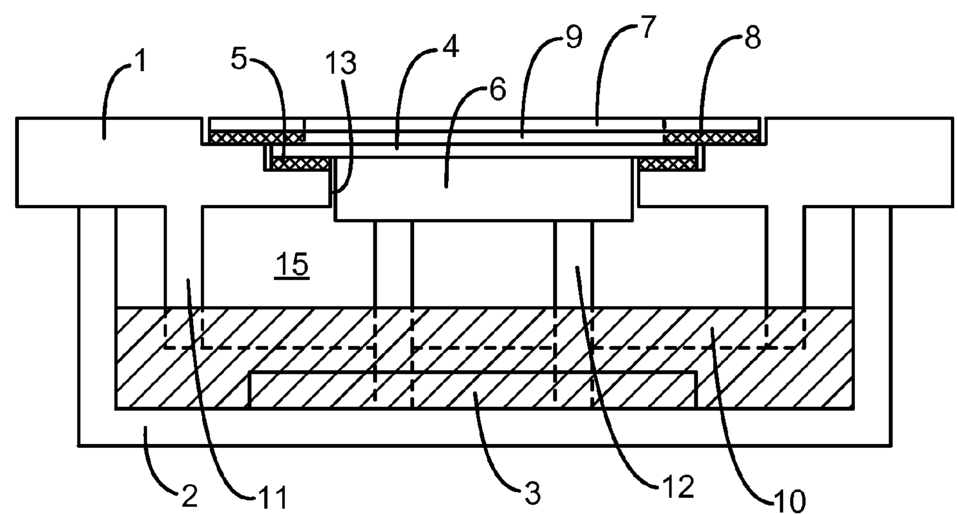
FIG. 1 is
Figure 2:
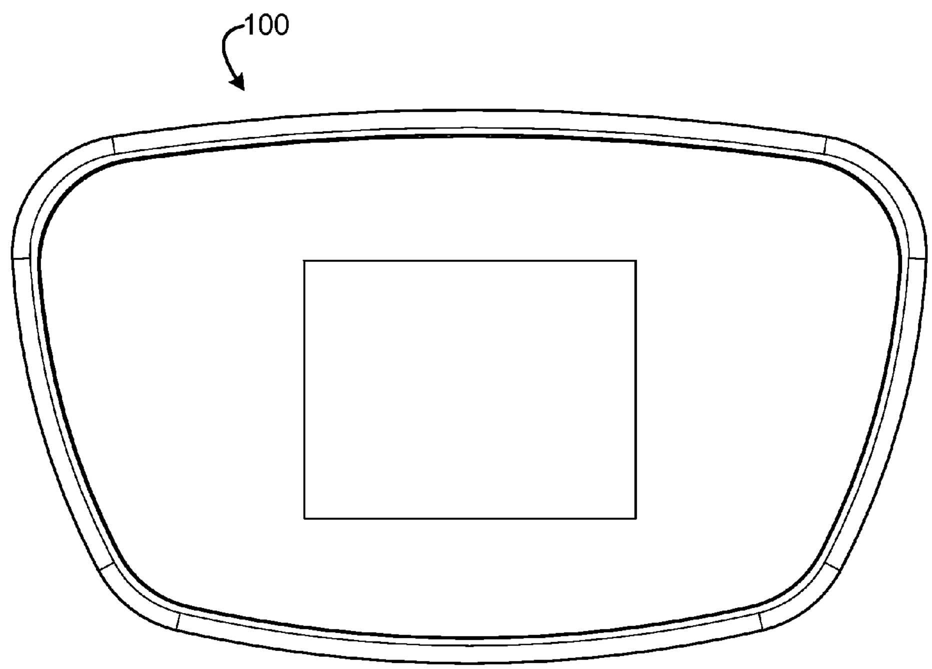
FIG. 2 is a top view of an alternate embodiment of a touch screen panel.
Figure 3:
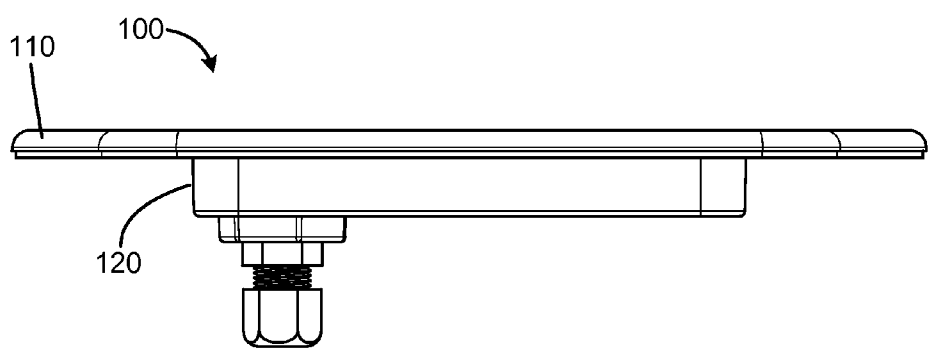
FIG. 3 is a side view of the touch screen panel of FIG. 2.

Referring now to FIG. 1, the housing of an exemplary embodiment of the product includes an upper housing 1 and lower housing 2. LCD/touch screen assembly 6 is positioned in contact with, or very near, protective film 4, which is held in contact with upper housing 1 over cutout area 13 in the housing by means of adhesive layer 5. Another layer of protection is provided by decorative overlay 7, which is held in position by adhesive layer 8. Adhesive layer 8 overlaps the vertical positioning of adhesive layer 5 so that the interface between 1 and 4 is covered.

Circuit board 3 is positioned and secured to lower housing 2 and electrically coupled to LCD/touch screen assembly 6. Silicone gel 10 is placed in lower housing 2 to cover circuit board 3, making circuit board 3 virtually waterproof.

When upper housing 1 and lower housing 2 are joined together and secured with fasteners, protrusion 11 from upper housing 1 penetrates silicone gel 10, making the back side of LCD/touch screen 6 also waterproof.

Protrusion 12 from lower housing 2 holds LCD/touch screen assembly 6 in a secured position.

In operation, protective film 4 lies directly on top of the touch screen surface of assembly 6. Film 4 is thin enough to be flexible when lightly touched. A thickness of 0.020 inches is known to work well when the material is polycarbonate. In all cases, the material must be very flat, without high and low spots which could cause false switching. The adhesive material used in 5 and 8 is water resistant. Several foam gasket materials are available, as well as adhesive films, such as 3M 467MP and 468MP. The use of decorative overlay 7 with adhesive layer 8 provides a small air gap 9, which is the same as the thickness of adhesive layer 8. This air gap improves the performance of the product in certain environments.

Additional methods of securing 6 in position with film 4 may be employed. An adhesive material between 6 and 1, correctly applied, can eliminate the need for protrusion 12 from lower housing 2 to secure LCD/touch screen assembly 6.

Lower housing 2 is constructed to allow circuit board 3 to be secured to 2 and covered with sealing material 10, prior to final assembly of the two housing parts, 1 and 2. The final seal is made when protrusion 11 from 1 are embedded in sealing material 10.

When constructed as described, the user interface panel is waterproof from moisture on the top surface of the panel as well as from moisture from the bottom and sides of the panel, even though the LCD/touch screen assembly is not constructed to be waterproof.

In another preferred embodiment, the protective film is ultrasonically bonded to the housing. In yet another preferred embodiment, the film is attached with an adhesive material able to fuse plastic materials, such as PVC cement.

The present invention may be used on spas, hot tubs, baths, swimming pools, steam baths, showers, and similar products.

Another embodiment of a user interface panel is illustrated in FIGS. 2-6B. This embodiment addresses a potential issue of reliability and performance which can result when a sealed user interface panel is used in a hot environment, such as spas, hot tubs, baths, swimming pools, steam baths, and showers. A void may exist in the sealed housing assembly between the surface of encapsulant material covering the circuit board and the back of the LCD assembly and undersurface of the top housing. With the panel in such an environment, the air within the void tends to expand, increasing the pressure, and this is in a sealed structure. The increase in pressure within the housing can tend to lift the thin protective film housing structure. The increase in pressure within the housing can tend to lift the thin protective film away from the LCD/touch screen assembly, and lead to performance issues in which button pushes are not recognized, and possible delamination issues in which the film separates from the housing structure.

To address this potential issue, in an exemplary embodiment, a vent is established between the void within the sealed housing and the ambient atmosphere. The vent may be covered by a filter which blocks transfer of solid water, but allows air and water vapor to pass. An exemplary embodiment of the user interface panel 100 with such a vent is illustrated in FIGS. 2-6B. As with the embodiment of FIG. 1, panel 100 includes an upper housing 110 with a top surface 110A, and a lower housing 120 with a bottom surface 120A. A cutout area 113 is formed in the upper housing 110. An electronic display 160 with assembled or integrated touch screen is positioned in contact with, or very near, protective film 140. The film 140 is held in contact with the upper housing 110 over the cutout area 113 by an adhesive layer (not shown in FIGS. 4B and 4C). Another layer of protection is provided by a decorative or informative overlay 180, which is held in position to the upper housing by an adhesive layer (not shown in FIGS. 4B and 4C). The electronic display 160 can be supported on tab portions 112 (FIGS. 4A and 4B) of the upper housing structure 110 which protrude inwardly into the cutout area. Standoff portions 122 protrude upwardly from the lower housing 120, and can provide additional support in the event the electronic display 160 is pushed downwardly by user button pressing.

Figure 4A:
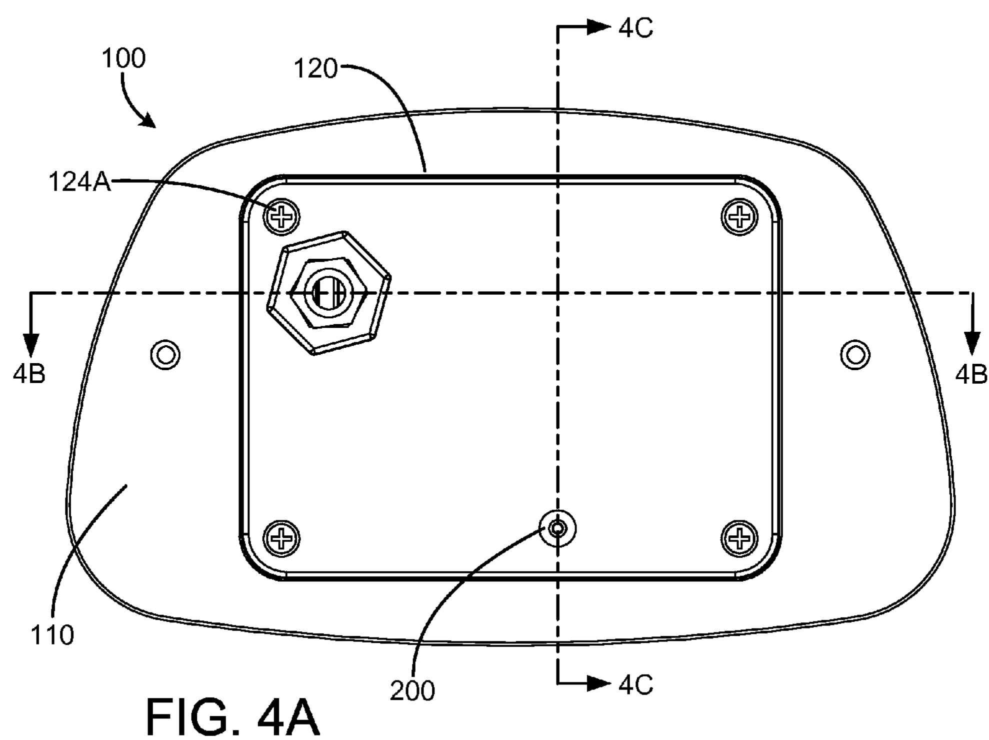
FIG. 4A is a bottom view of the touch screen panel of FIG. 2.
Figure 4B:
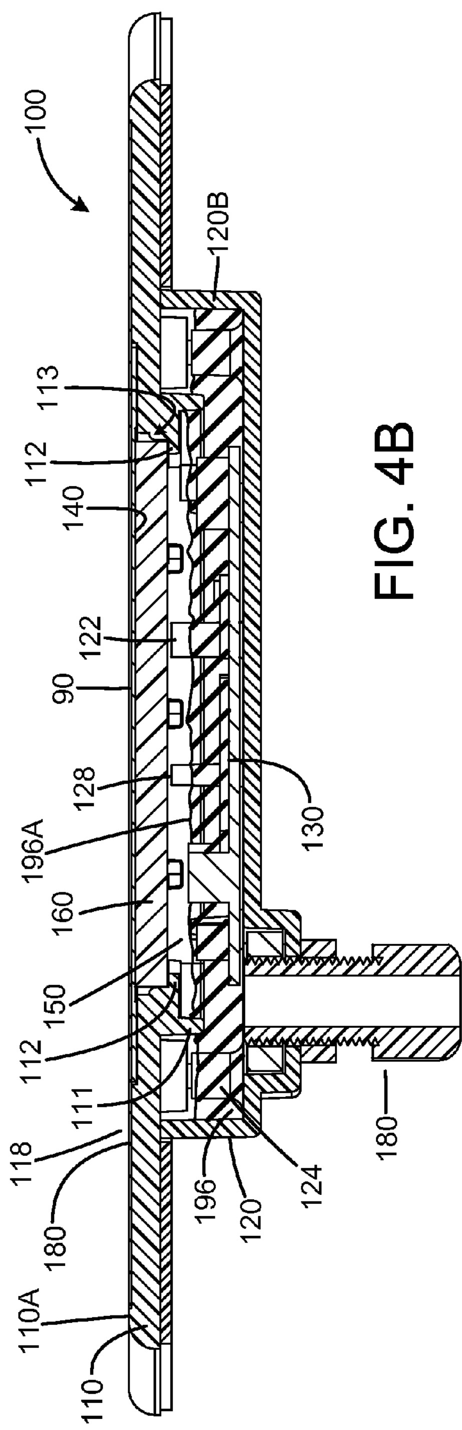
FIG. 4B is a cross-sectional view taken along line 4B-4B of FIG. 4A.

In this exemplary embodiment, the lower housing 120 and upper housing 110 are secured together by threaded fasteners 124A (FIG. 4A) passed through bosses 124 in the lower housing and into corresponding bosses 118 in the upper housing 110 (FIG. 4B).

A circuit board 130 is positioned adjacent the bottom floor of the lower housing 120 and secured in place. The circuit board is electrically coupled to the display assembly 160. A layer 196 of waterproof potting compound or silicone gel is placed in the lower housing and covers most or all of the circuit board 130 and components mounted to the circuit board. A void 150 is created between the upper surface of the layer 196 and the back side surface of the display assembly 160. A circumferential protrusion 111 extends downwardly from the upper housing 110, surrounding the cutout area 113, and penetrates the gel 196, making the back side of the assembly 160 water proof. The circuit board 130 is electrically connected to the electronic display 160 by wiring (not shown). Power and signal wiring from the external environment, e.g. from a control system, is connected to the circuit board 130 through waterproof passthrough 180.

When constructed as described, the user interface panel 100 is waterproof from moisture on the top surface of the panel as well as from moisture from the bottom and sides of the panel, even though the touch screen assembly is not constructed to be waterproof.

Figure 4C:
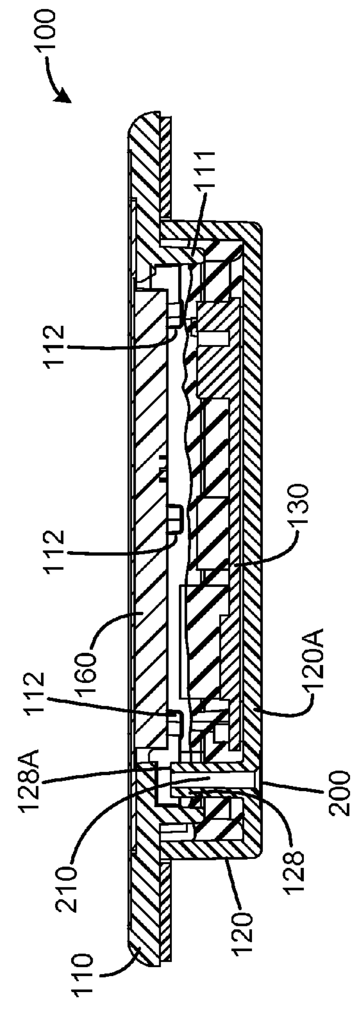
FIG. 4C is a cross-sectional view taken along line 4C-4C of FIG. 4A.
Figure 5A:
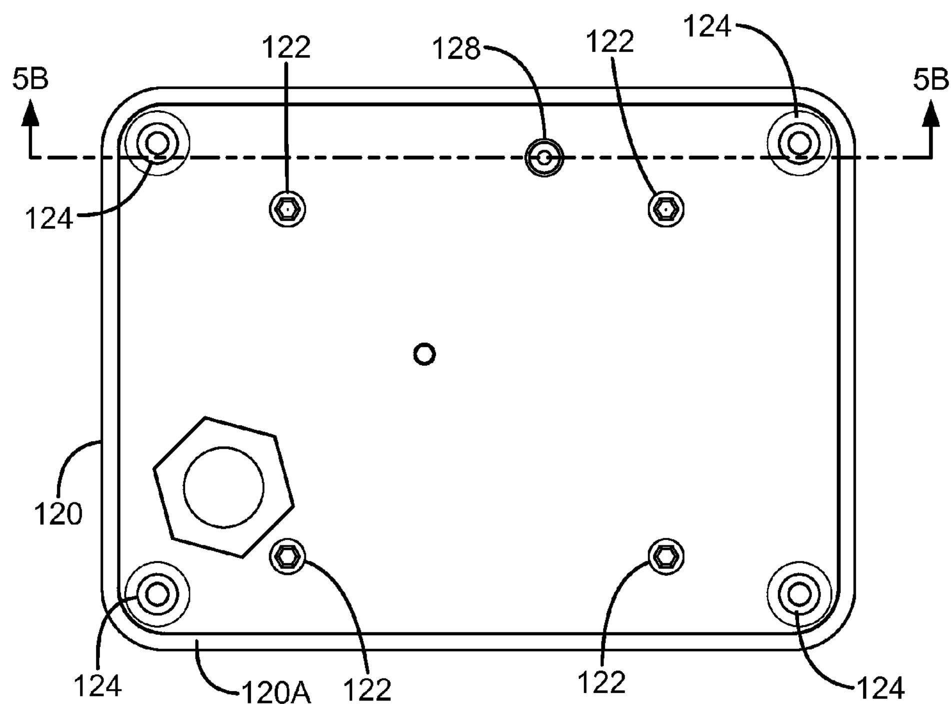
FIG. 5A is a top view of the lower housing structure of the touch screen panel of FIG. 2.
Figure 5B:
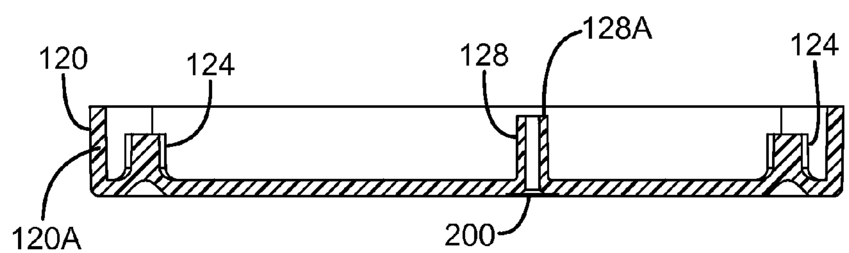
FIG. 5B is a cross-sectional view taken along line 5B-5B of FIG. 5A.
Figure 6A:
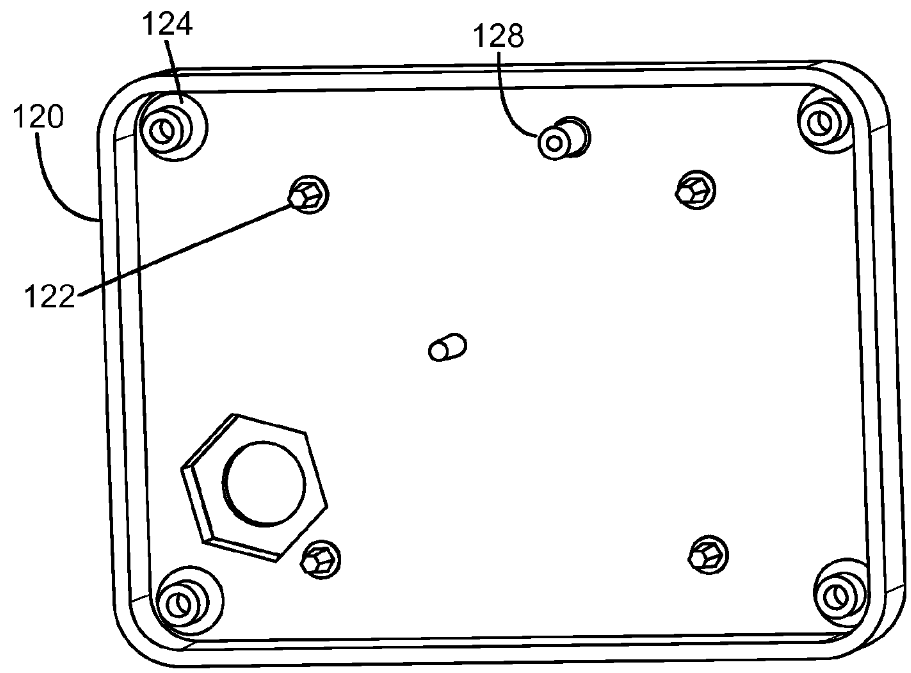
FIG. 6A is an isometric top view of the lower housing structure of FIG. 5A.
Figure 6B:
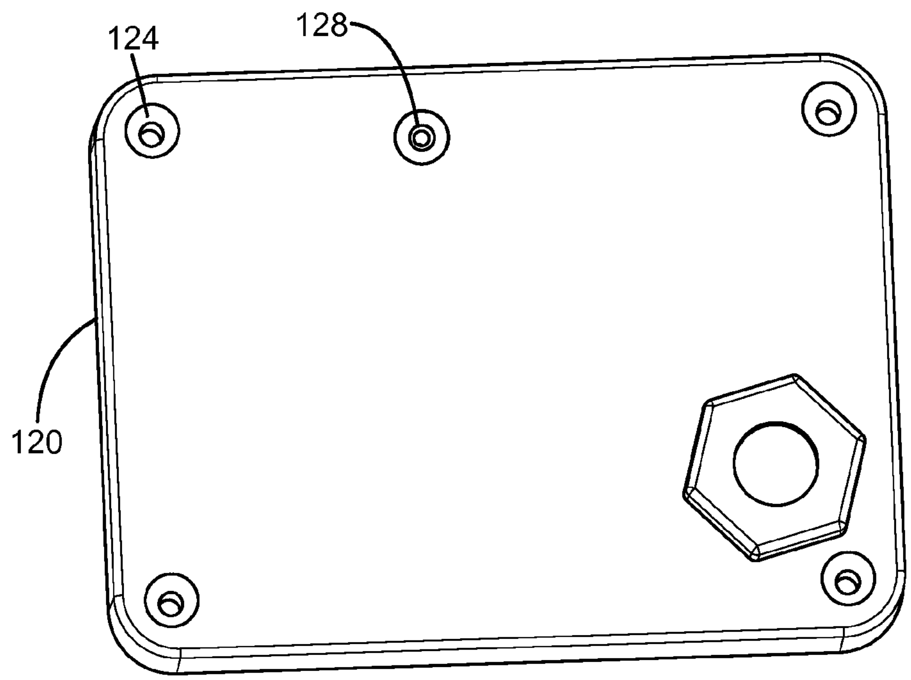
FIG. 6B is an isometric bottom view of the lower housing structure of FIG. 5A.

In this exemplary embodiment, the void 150 is vented to the external environment by hollow boss 128, which is open through its longitudinal extent, between the bottom 120A of the lower housing 120 and the distal, upper tip 128A of the boss 128 (see FIG. 4C). A filter 200 covers the bottom surface opening of the hollow boss 128, and is configured to allow air and water vapor to pass while preventing entry of water droplets into the panel 100. The filter 200 may include a barrier membrane, formed of Gore-Tex® or other breathable waterproof material. As the ambient temperature is increased, the vent 128 prevents buildup of air pressure within the void 150, maintaining equilibrium between the pressure in void 150 and the ambient air pressure. This reduces the risk of malfunctions due to an increase in pressure within the void 150, otherwise tending to push the film 140 upwardly, and tending to detach the film from the upper housing or its close contact with the touch sensitive surface of the display 160.

In other embodiments, the vent may be positioned in other locations in the upper or lower housing, for example.

A waterproof user interface panel 100 as shown in FIGS. 2-6B thus includes an electronic display assembly 160 having a touch sensitive surface for activation of one or more touch switches, and housing (110, 120) for the assembly 160, the housing including a cutout area 113. A protective film 140 is disposed over the assembly 160 and secured to the housing at a peripheral region surrounding the cutout area to prevent moisture intrusion into the housing through the cutout area. The protective film 140 is configured to be flexible when touched by a user to permit activation of the touch switches of the electronic display assembly. In an exemplary embodiment, the housing includes a top surface 110A, a bottom surface 120A and a peripheral sidewall 120B between the top surface and the bottom surface to define a housing cavity, the cutout area being formed in the top surface. In this exemplary embodiment, the display assembly 160 is located adjacent the cutout area of the housing. Sealing material 196 is located in the housing cavity covering the bottom surface and having a sealing material top surface 196A above the bottom surface of the housing. The sealing material does not fill the housing, such that a void 150 is defined in the housing cavity between the top surface of the sealing material and the electronic display assembly. A vent 210 is provided between the void and the external environment to allow air to pass to equalize air pressure within the void to ambient air pressure. A filter 200 may be positioned in the vent to prevent the passage of water droplets through the filter and entering the vent from the external environment while allowing the passage of air and water vapor.

Others skilled in the arts may make improvements in what is taught herein without departing from the spirit of the present invention.

What is claimed is:

1. A waterproof user interface panel comprising:

an electronic display;

a touch screen positioned over and secured to said display to form an display/touch screen assembly having a touch screen surface with at least one touch switch;

a housing for said assembly, the housing including a cutout area; and a protective film over said assembly and secured to said housing at a peripheral region surrounding the cutout area to prevent moisture intrusion into said housing through the cutout area; and wherein the protective film lies directly on top of a touch screen surface of said assembly, the protective film configured to be flexible when touched by a user to permit activation of touch screen switches; and wherein:

said housing includes an upper housing and a lower housing, the cutout area being formed in the upper housing, with said assembly located in said upper housing and adjacent the cutout area of the upper housing, the lower housing having a bottom surface and a peripheral sidewall defining a housing cavity;

sealing material located in the lower housing covering the bottom surface and having a sealing material top surface above the bottom surface of the lower housing;

said upper housing including a protrusion surrounding the cutout area and which extends into the housing cavity in the lower housing and penetrates the sealing material in the lower housing when said upper and said lower housings are assembled such that a portion of the protrusion is embedded in the sealing material to form a waterproof seal to protect a back side of said assembly from external moisture;

wherein the sealing material does not fill the lower housing, such that a void is defined between an upper surface level of the sealing material and a lower surface of the upper housing;

a vent between the void and the external environment to allow air to pass between the void and the external environment to equalize air pressure within the void to ambient air pressure; and a filter positioned in the vent to prevent the passage of water droplets through the filter and entering the vent from the external environment while allowing the passage of air.

2. The interface panel of claim 1, wherein said vent comprises a passageway formed in a hollow boss extending from the bottom surface of the lower housing and having a tip extending above the sealing material top surface, the passageway extending between an opening formed in the bottom surface of the lower housing and the hollow boss tip.

3. The interface panel of claim 2, wherein the filter is positioned to cover the opening formed in the bottom surface of the lower housing.

4. The interface panel of claim 1, wherein the filter comprises a layer of a breathable waterproof material.

5. The interface panel of claim 1, wherein the protective film is polycarbonate.

6. The interface panel of claim 1, wherein said lower housing has protrusions to hold said display/touch screen assembly in a fixed position relative to said upper housing.

7. The interface panel of claim 1, further comprising:

a circuit board secured to the lower housing and electrically coupled to the display/touch screen assembly, the sealing material covering the circuit board.

8. The interface panel of claim 1, wherein the sealing material is a gel material.

9. The interface panel of claim 1, wherein the electronic display assembly is not constructed to be waterproof.

10. A waterproof user interface panel comprising:

an electronic display;

a touch screen positioned over and secured to said display to form an display/touch screen assembly having a touch screen surface with at least one touch switch;

a housing for said assembly, the housing including a cutout area; and a protective film over said assembly and secured to said housing at a peripheral region surrounding the cutout area to prevent moisture intrusion into said housing through the cutout area; and wherein the protective film lies directly on top of a touch screen surface of said assembly, the protective film configured to be flexible when touched by a user to permit activation of touch screen switches; and wherein:

said housing includes an upper housing and a lower housing, the cutout area being formed in the upper housing, with said assembly located in said upper housing and adjacent the cutout area of the upper housing, the lower housing having a bottom surface and a peripheral sidewall defining a housing cavity;

sealing material located in the lower housing covering the bottom surface and having a sealing material top surface above the bottom surface of the lower housing;

said upper housing including a protrusion surrounding the cutout area and which extends into the housing cavity in the lower housing and penetrates the sealing material in the lower housing when said upper and said lower housings are assembled such that a portion of the protrusion is embedded in the sealing material to form a waterproof seal to protect a back side of said assembly from external moisture;

wherein the sealing material does not fill the lower housing, such that a void is defined between an upper surface level of the sealing material and a lower surface of the upper housing; and a vent between the void and the external environment to allow air to pass between the void and the external environment to equalize air pressure within the void to ambient air pressure.

* * * * *